United States Patent
Seo

(10) Patent No.: US 9,714,001 B2
(45) Date of Patent: Jul. 25, 2017

(54) PEDESTRIAN PROTECTION APPARATUS OF VEHICLE

(71) Applicant: Hyundai Mobis Co., Ltd., Seoul (KR)

(72) Inventor: Sung Hwan Seo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 4 days.

(21) Appl. No.: 14/673,229

(22) Filed: Mar. 30, 2015

(65) Prior Publication Data

US 2015/0291122 A1   Oct. 15, 2015

(30) Foreign Application Priority Data

Apr. 10, 2014   (KR) ................ 10-2014-0043221

(51) Int. Cl.
| | | |
|---|---|---|
| *B60R 22/00* | (2006.01) | |
| *E05F 15/00* | (2015.01) | |
| *G05D 1/00* | (2006.01) | |
| *B60R 21/34* | (2011.01) | |
| *B60R 21/0136* | (2006.01) | |
| *G01L 5/00* | (2006.01) | |
| *B60R 19/48* | (2006.01) | |

(52) U.S. Cl.
CPC ............ *B60R 21/34* (2013.01); *B60R 19/483* (2013.01); *B60R 21/0136* (2013.01); *G01L 5/0052* (2013.01)

(58) Field of Classification Search
CPC ............ B60R 21/34; B60R 2021/346; B60R 21/0136; B60R 19/483; G01L 5/0052
USPC .......................................................... 701/45
See application file for complete search history.

(56) References Cited

U.S. PATENT DOCUMENTS

| | | | |
|---|---|---|---|
| 2004/0210367 A1 | 10/2004 | Takafuji et al. | |
| 2006/0087417 A1* | 4/2006 | Kiribayashi | B60R 19/483 340/435 |
| 2014/0207330 A1* | 7/2014 | Meir | B60R 21/0136 701/33.9 |
| 2015/0203068 A1* | 7/2015 | Foo | B60R 21/38 701/1 |
| 2015/0274119 A1* | 10/2015 | Schondorf | B60R 19/483 293/132 |

FOREIGN PATENT DOCUMENTS

| | | |
|---|---|---|
| JP | 2004-317247 | 11/2004 |
| JP | 2006290292 A * | 10/2006 |
| JP | 2007-83846 | 4/2007 |
| JP | 2011-247628 | 12/2011 |

(Continued)

OTHER PUBLICATIONS

Chinese Office Action dated Oct. 10, 2016, in Chinese Patent Application No. 201510146511.9.

*Primary Examiner* — Isaac Smith
(74) *Attorney, Agent, or Firm* — H.C. Park & Associates, PLC

(57) ABSTRACT

A pedestrian protection apparatus of a vehicle includes a first pressure sensor installed at a first side of a front side of the vehicle and a second pressure sensor installed at a second side of the front side of the vehicle. A hollow tube extends between and is connected with each of the first and second pressure sensors. A control unit is configured to receive pressure values output by the first and second pressure sensors and determine whether a collision object is a pedestrian based on the received pressure values.

8 Claims, 3 Drawing Sheets

(56) References Cited

FOREIGN PATENT DOCUMENTS

| JP | 5454926 | 3/2014 |
|---|---|---|
| WO | 2013/041383 | 3/2013 |
| WO | 2013/176652 | 11/2013 |

* cited by examiner

PEDESTRIAN PROTECTION APPARATUS OF VEHICLE

CROSS-REFERENCE TO RELATED APPLICATIONS

This application claims priority from and the benefit of Korean Patent Application Number 10-2014-0043221, filed on Apr. 10, 2014, which is hereby incorporated by reference for all purposes as if fully set forth herein.

BACKGROUND

Field

Exemplary embodiments relate to a pedestrian protection apparatus of a vehicle, and more particularly, to a pedestrian protection apparatus of a vehicle that determines a type and a position of an object colliding with the vehicle.

SUMMARY

Exemplary embodiments provide a pedestrian protection apparatus of a vehicle.

Exemplary embodiments provide a pedestrian protection apparatus of a vehicle that senses a change in gas pressure in a tube in a pedestrian protection apparatus installed on the vehicle to protect the pedestrian. The pedestrian protection apparatus determines a collision position of an object, and accurately determines whether the collision is with a pedestrian so as to perform an operation to protect the pedestrian.

Additional aspects will be set forth in the detailed description which follows, and, in part, will be apparent from the disclosure, or may be learned by practice of the inventive concept.

An exemplary embodiment of the present invention discloses a pedestrian protection apparatus of a vehicle, including: a hollow tube connected with each of a plurality of pressure sensors; and a control unit configured to determine whether a collision object is a pedestrian based on a plurality of pressure values received from the plurality of pressure sensors.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
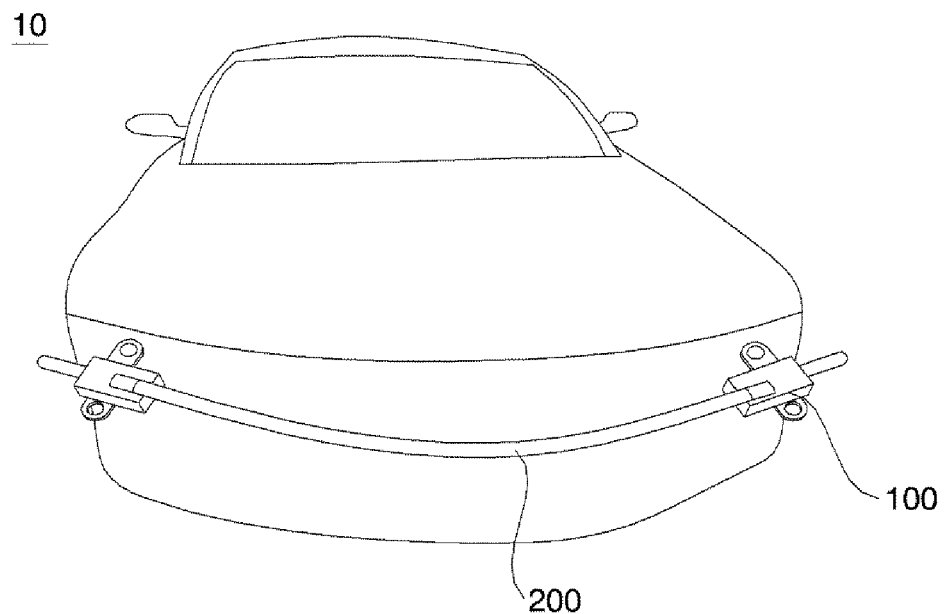
FIG. 1A is a front view of a pedestrian protection apparatus of a vehicle according to an exemplary embodiment of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, the present invention will be described with reference to drawings for describing a pedestrian protection apparatus of a vehicle by exemplary embodiments of the present invention.

Figure 1B:
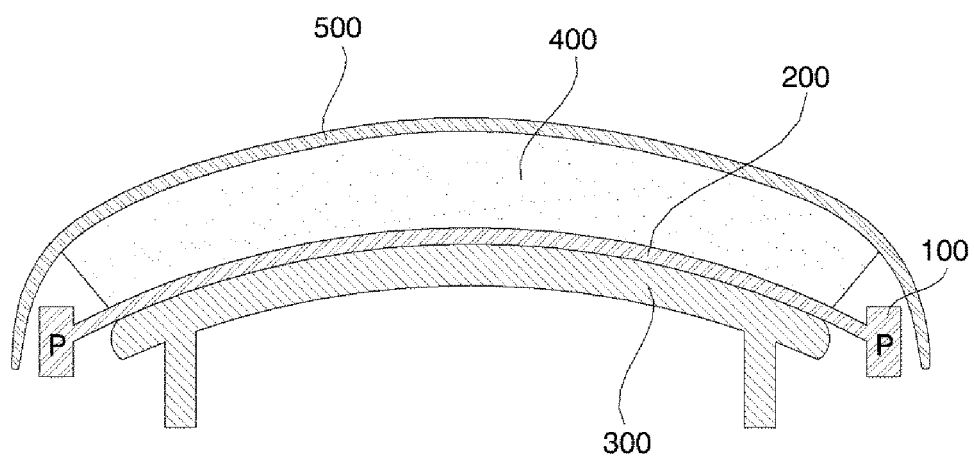
FIG. 1B is a sectional view of a pedestrian protection apparatus of a vehicle according to an exemplary embodiment of the present invention.
Figure 2:
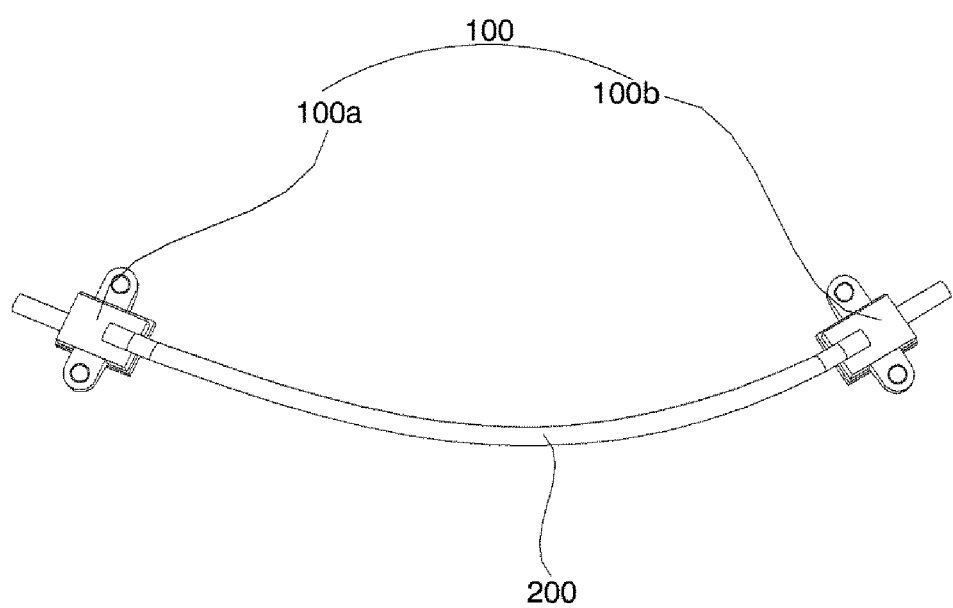
FIG. 2 is a front view of portions of a pedestrian protection apparatus of a vehicle according to the exemplary embodiment of the present invention.

FIG. 1A is a front view of a pedestrian protection apparatus of a vehicle according to an exemplary embodiment of the present invention. FIG. 1B is a sectional view of a pedestrian protection apparatus of a vehicle according to an exemplary embodiment of the present invention. FIG. 2 is a front view of the pedestrian protection apparatus of a vehicle according to the exemplary embodiment of the present invention.

The pedestrian protection apparatus of a vehicle according to the preferred embodiment may be modified by those skilled in the art and in the exemplary embodiment of the present invention, the pedestrian protection apparatus is preferred.

Referring to FIGS. 1A, 1B, and 2, the pedestrian protection apparatus of a vehicle according to the exemplary embodiment of the present invention includes a plurality of pressure sensor modules 100 installed at both sides of a front bumper 500 of the vehicle and a tube 200 disposed between the plurality of pressure sensor modules 100 and connected with the plurality of respective pressure sensor modules 100. The tube 200 is hollow and flexible or compressible (i.e., crushable) such that upon external contact with an object, gas flows into the respective pressure sensor modules 100.

The plurality of pressure sensor modules 100 may be installed at both sides of a front cross member 300 of the vehicle, but the present invention is not limited thereto and the plurality of pressure sensor modules 100 may be installed at both sides, and may include other elements such as foam 400, a sensor bumper fascia, and the like in the bumper 500 of the vehicle. Each of the plurality of pressure sensor modules 100 is connected with the hollow tube 200, respectively. The plurality of pressure sensor modules 100 may be directly connected with both sides of the tube 200 and the plurality of pressure sensor modules 100 may be connected with the both sides of the tube 200 with another member inserted therebetween.

A pressure sensor may be provided inside a casing of the pressure sensor module 100. In more detail, the pressure sensor may be disposed below the casing in order to precisely sense a change amount of internal pressure, but the present invention is not limited thereto. In this case, the pressure sensor may be positioned below the tube 200.

Referring to FIG. 2, the hollow tube 200, in which gas can flow, is disposed between the plurality of pressure sensor modules 100 (100a, 100b) and connected with each of the plurality of pressure sensor modules 100a, 100b.

The diameter of an inlet end connected with the tube 200 of the pressure sensor module 100 may be larger or smaller than that of the tube, and as a result, the diameter is not limited to any particular size. The pressure sensor module 100 may determine the pressure of the gas in the tube and transmit information on the pressure to a control unit.

The pressure sensor module 100 may include the pressure sensor therein. The pressure sensor may derive a pressure value indicating the pressure of the gas in the tube and provide the derived pressure value to the control unit. The control unit receives pressure values from two pressure sensors and may determine a type and/or a position of the object colliding with the vehicle based on the received pressure values.

Figure 3:
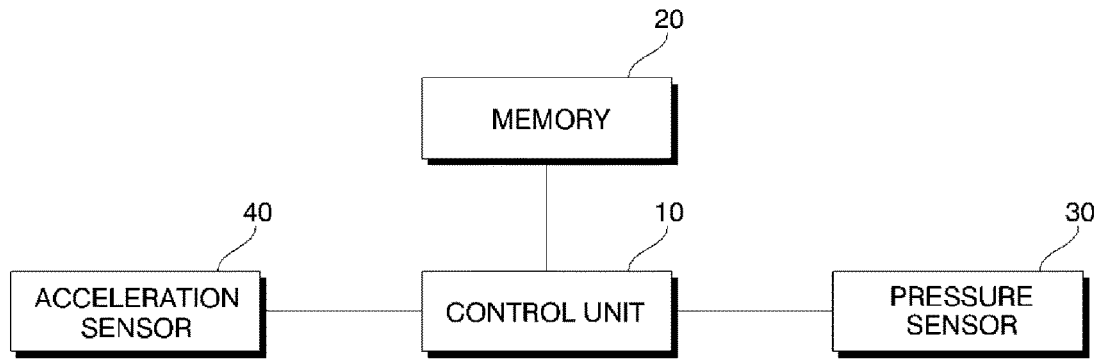
FIG. 3 is a block diagram illustrating components of the pedestrian protection apparatus of a vehicle according to the exemplary embodiment of the present invention.
Figure 4:
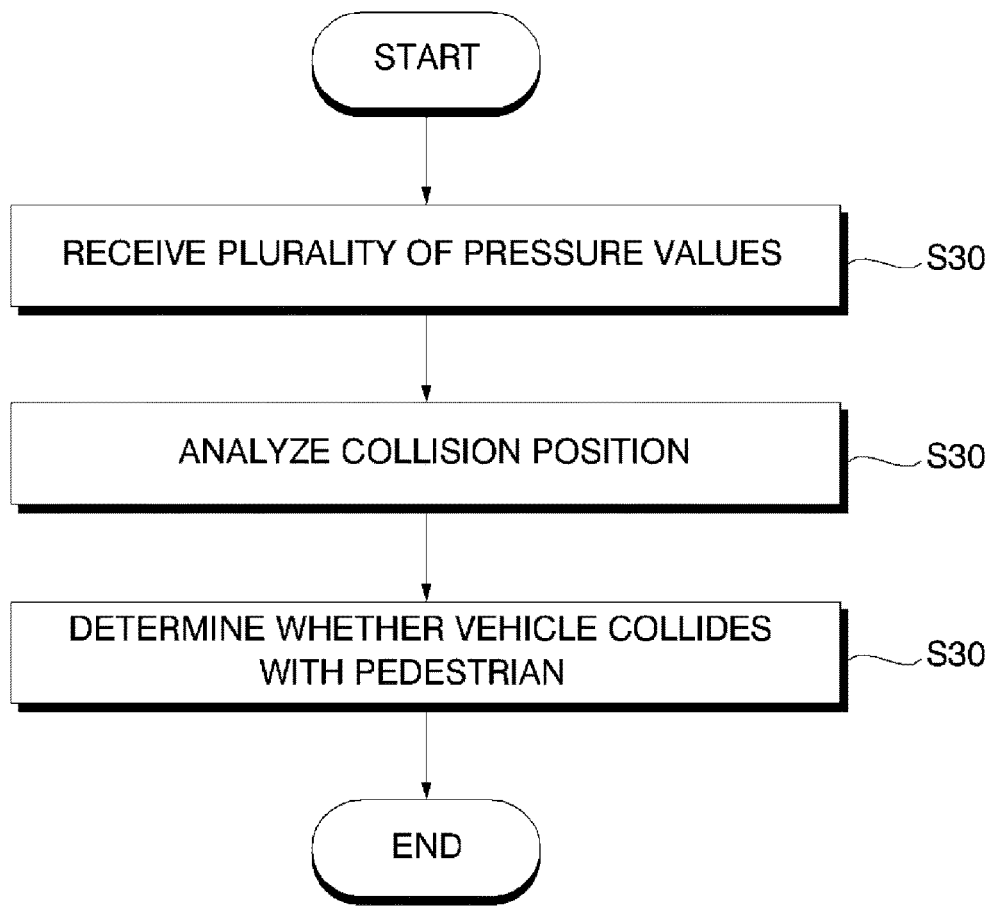
FIG. 4 is a flowchart illustrating a method for controlling a pedestrian protection apparatus of a vehicle according to another exemplary embodiment of the present invention.

FIG. 3 is a block diagram illustrating components of the pedestrian protection apparatus of a vehicle according to the exemplary embodiment of the present invention. FIG. 4 is a flowchart illustrating a method for controlling a pedestrian protection apparatus of a vehicle according to another exemplary embodiment of the present invention.

Referring to FIGS. 3 and 4, the pedestrian protection apparatus of a vehicle according to the exemplary embodiment of the present invention may include a plurality of pressure sensors 30 installed at both sides of a front side of the vehicle and a control unit 10 connected with each of the plurality of pressure sensors 30 and configured to determine a collision position with an external object based on a plurality of pressure values received from the hollow tube and the plurality of pressure sensors 30.

The control unit 10 may control various components of the vehicle. For example, the control unit 10 receives the pressure values from the plurality of pressure sensors 30 and may determine what the object colliding with the vehicle is based on the received pressure values.

The control unit 10 may receive the pressure value from the pressure sensor 30 (S10). The control unit 10 may determine which position of the front side of the vehicle the collision occurs at, from the plurality of pressure values received from the plurality of pressure sensors 30. The control unit 10 may have an output signal of the pressure sensor 30, which is controlled without noise as an input, by using a low pass filter (not shown).

The control unit 10 determines a pressure value indicating a change in pressure of the gas in the tube connected with the pressure sensor 30 to determine a mass of the collision object. The control unit 10 may determine whether the collision object is a pedestrian by taking into consideration the speed of the vehicle, the collision position, and the like.

The control unit 10 may determine the collision position by differences among points of time when the pressure values are received from the plurality of pressure sensors 30 (S20). The control unit 10 may determine the points of time when the pressure values are received from the plurality of pressure sensors 30. When the control unit 10 receives the plurality of pressure values, the control unit 10 may determine the respective received points of time and determine intervals among time among the points of time. The control unit 10 may then determine the position based upon the known positions of the pressure sensors 30 that transmit the pressure values.

The control unit 10 may determine that the collision occurs at a position adjacent to the pressure sensor 30 that first transmits the pressure value, among the plurality of pressure sensors 30. The control unit 10 may determine where the collision occurs from a pressure value transmission point of time of the pressure sensor 30 that transmits the pressure value later among the plurality of pressure sensors 30.

For example, when the plurality of pressure values are simultaneously received, the control unit 10 may determine that the collision occurs on the front of the vehicle. For example, when the control unit 10 receives the pressure value from the left pressure sensor 30 and thereafter, receives the pressure value from the right pressure sensor 30, the control unit 10 may determine that the collision occurs at a position adjacent to the left pressure sensor.

The control unit 10 may determine that the collision occurs at a position adjacent to the pressure sensor that first transmits the pressure value. The control unit 10 may determine how far the collision occurs at a position from the pressure sensor 30 that first transmits the pressure value according to a time between a point of time of receiving the pressure value later and a point of time of receiving the pressure value first.

When the control unit 10 receives the pressure value from the pressure sensor 30, the control unit 10 may control a signal width of the output signal based on the received pressure value. When the received pressure value is equal to or more than a first pressure value, the control unit 10 may increase a signal width variable. When the received pressure value is equal to or less than a second pressure value, the control unit 10 may decrease the signal width variable. When the pressure value output by the pressure sensor 30 has a magnitude between a first pressure value and a second pressure value, the control unit 10 may output an output signal having a signal width with a predetermined size, and when the pressure value is over a range between the first pressure value and the second pressure value, the control unit may increase or decrease the signal width of the output signal depending a degree that the value is over the range.

The control unit 10 may control the signal width in a hysteresis manner, but the present invention is not limited thereto. The control unit 10 may decide the output signal width based on the pressure value.

The control unit 10 outputs the pressure signal to determine whether the output value is the pedestrian. The control unit 10 may determine whether pressure over a threshold value is generated so as to determine whether the pressure value is the pedestrian by outputting the pressure signal. The control unit 10 may determine a pulse width from the pressure signal. The control unit 10 may determine whether the vehicle collides with the pedestrian by determining the relationship between the pulse width of the pressure signal and the pressure value.

The control unit 10 may receive the pressure value from at least one of the plurality of pressure sensors 30. When the control unit 10 receives the pressure value from any one of the pressure sensors 30 disposed at both sides of the tube, respectively, the control unit 10 may determine whether the collision occurs by using another pressure sensor. For example, when the control unit 10 receives the pressure value from any one of the pressure sensors 30 disposed at both sides of the tube, respectively, the control unit 10 may determine whether another pressure sensor senses pressure which is equal to or more than the threshold value.

Although the control unit 10 receives the pressure value from any one pressure sensor, when another pressure sensor may not sense the pressure which is equal to or more than the threshold value, the control unit 10 may determine that the collision is not with a pedestrian.

When both pressure sensors sense the pressure, the control unit 10 may determine that the vehicle collides with the object. For example, when any one of both pressure sensors 30 senses the pressure, the control unit 10 may determine whether the other pressure sensor 30 senses the pressure.

When the control unit 10 receives the pressure values from the plurality of pressure sensors 30, the control unit 10 may determine whether a pedestrian collision condition is satisfied.

The control unit 10 may calculate an accumulation value acquired by adding up pressure values for a predetermined time. The control unit 10 may determine whether the collision object is the pedestrian by considering the accumulation value and the pressure values.

The control unit 10 may determine the collision position by differences among points of time when the plurality of pressure sensors 30 senses the pressure. The control unit 10 sets a plurality of time ranges and may determine the collision position based on a time range to which the differences among the points of time when the plurality of pressure sensors 30 senses the pressure belong.

For example, the control unit 10 may set a first time range to a time range which is less than 2 ms, a second time range to a time range of 2 ms to 4 ms, and a third time range to a time range which is equal to or more than 4 ms. When the differences among the points of time of sensing the pressure is in the first time range, the control unit 10 may determine that the collision occurs at the center.

When the differences among the points of time of sensing the pressure is in the second time range, the control unit 10 may determine that the collision occurs at a portion between the center and the pressure sensor. When the differences among the points of time of sensing the pressure is in the third time range, the control unit 10 may determine that the collision occurs around the pressure sensor 30. However, the time values are not limited to the exemplary times, and may vary depending on the size of the vehicle.

The control unit 10 may determine the speed of the vehicle at the point of time of receiving the pressure value. The control unit 10 may determine whether to perform an operation for protecting the pedestrian based on the speed when the vehicle collides. For example, when the pedestrian collides and a predetermined condition is satisfied, the control unit 10 expands an airbag or deploys a similar protective device on the front side of the vehicle to protect the pedestrian.

For example, when the speed upon the collision of the vehicle is within a predetermined range, the control unit 10 may perform the operation for protecting the pedestrian. For example, when the speed upon the collision of the vehicle is within the predetermined range, as the speed upon the collision of the vehicle increases, the control unit 10 may increase the pressure threshold value of performing the operation for protecting the pedestrian.

For example, when the speed upon the collision of the vehicle is in the range of 20 kph to 50 kph, the control unit 10 may perform the operation for protecting the pedestrian.

The control unit 10 may differentially apply the pressure threshold value of performing the operation for protecting the pedestrian depending on the collision position of the object. For example, when the speed upon the collision of the vehicle is equal to or more than approximately 30 kph, the control unit 10 increases the pressure value indicating that the object is the pedestrian to prevent erroneous expansion of the pedestrian protecting operation.

The pedestrian protection apparatus of a vehicle according to the exemplary embodiment of the present invention may further include the acceleration sensor 40. The acceleration sensor 40 may determine an acceleration of the vehicle. The control unit 10 may reverify whether the pressure value sensed by the pressure sensor 30 is generated through the collision with the pedestrian depending on a change in acceleration of the vehicle, which is sensed by the acceleration sensor 40.

The acceleration sensor 40 may be used to determine whether the front airbag is expanded when the vehicle collides head-on. The acceleration sensor 40 may be mounted on a front end module (FEM), a side member or a back beam, and the like. However, the acceleration sensor 40 may be installed at various positions, and as a result, the installation position is not limited to any one.

When the acceleration sensor 40 is disposed at the sides and a rear side of the vehicle, the control unit 10 may determine whether an acceleration accumulation amount (moving sum) of at least any one of left, right, and rear acceleration sensors of the vehicle is over a threshold value.

When the acceleration accumulation amount is not over a predetermined threshold value, the control unit 10 may prevent the operation for protecting the pedestrian.

The control unit 10 may determine an X-axis acceleration value sensed by an acceleration sensor in an airbag expansion logic (ACU). The control unit 10 may determine whether an accumulation amount of the X-axis acceleration value sensed by the acceleration sensor in the airbag expansion logic (ACU) is over the threshold value.

When the accumulation amount of the X-axis acceleration values sensed by the acceleration sensor is over the threshold value, the control unit 10 determines that the collision condition is a front collision condition such as a vehicle-to-vehicle collision or a fixed wall-to-vehicle collision to prevent the operation of the pedestrian protection apparatus.

Even when the control unit 10 determines that the vehicle collides with the object based on the pressure value received from the pressure sensor 30, the control unit 10 does not immediately perform the operation for protecting the pedestrian and may determine whether the vehicle has collided with a pedestrian based on the acceleration value sensed by the acceleration sensor.

For example, when the control unit 10 determines that the acceleration sensed by the acceleration sensor 40 is changed due to the vehicle-to-vehicle collision or the collision with the object such as a wall, the control unit 10 may not perform the operation for protecting the pedestrian.

A memory 20 is connected to a processor of the control unit 10, and may include a high-speed random access memory (RAM). The memory 20 may also include a non-volatile memory such as one or more magnetic disk storage devices, a flash memory device, or other non-volatile virtual memories, but the present invention is not limited thereto and may include a non-transitory computer readable storage medium.

For example, the memory 20 may include an electronically erasable and programmable read only memory (EEPROM), but the present invention is not limited thereto. In the EEP-ROM, information may be written in and erased by the control unit 10. The EEP-ROM may be a memory device in which information stored therein is not erased but stored although power is turned off to stop supplying power.

A pedestrian collision position determining apparatus of a vehicle according to an exemplary embodiment may limitatively adopt the configurations and methods of the exemplary embodiments as described, but all or some of the respective exemplary embodiments may be selectively combined and configured so that the exemplary embodiments may be variously modified.

In an aspect, although an external tube is damaged by a dual-path structure tube installed in the pedestrian protection apparatus of a vehicle, protection of the pedestrian by sensing a variation in the amount of pressure of gas in an internal tube is improved based on more accurate determinations.

In an aspect, the pedestrian protection apparatus of a vehicle according to the exemplary embodiment of the present invention may accurately determine a collision position with an object based on differences among points of time when a plurality of pressure sensors sense a change in pressure, and then perform a pedestrian protection operation based thereon to protect the pedestrian.

In a further aspect, the pedestrian protection apparatus of a vehicle according to the exemplary embodiment of the present invention may additionally check whether the collision object is the pedestrian by using an acceleration sensor to prevent initiation of an unnecessary pedestrian protection operation.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A pedestrian protection apparatus of a vehicle, comprising:
    a first pressure sensor installed at a first side of a front side of the vehicle;
    a second pressure sensor installed at a second side of the front side of the vehicle;
    a hollow tube extending between and connected with each of the first and second pressure sensors; and
    a control unit configured to receive pressure values output by the first and second pressure sensors and determine whether a collision object is a pedestrian based on the received pressure values,
    wherein, when a first output pressure value exceeds a threshold pressure value and a second output pressure value does not exceed the threshold pressure value, the control unit is configured to determine that the collision object is not a pedestrian,
    wherein the control unit is configured to:
    set a plurality of time ranges, and determine the collision position based on the time range to which the differences among the points of time when the first and second pressure sensors senses pressure belong, or determine a collision position with the object based on a difference among points in time when the first and second pressure sensors receive the pressure values.

2. The apparatus of claim 1, wherein the control unit is configured to increase a signal width of an output signal when the received pressure value is equal to or more than a first pressure value and decreases the signal width of the output signal when the received pressure value is equal to or less than a second pressure value.

3. The apparatus of claim 1, wherein the control unit is configured to calculate an accumulation value acquired by adding up the received pressure values for a predetermined time.

4. The apparatus of claim 1, wherein the control unit is configured to:
    determine that the collision object is a pedestrian based at least in part on received pressure values exceeding the pressure threshold value;
    determine a speed of the vehicle at a point in time when at least one of the pressure values is received; and
    determine whether to perform an operation for protecting the pedestrian based on the speed of the vehicle.

5. The apparatus of claim 4, wherein the control unit is configured to:
    perform the operation for protecting the pedestrian when the speed of the vehicle is within a predetermined range, and increase the pressure threshold value for performing the operation for protecting the pedestrian as the speed of the vehicle increases within the predetermined range.

6. The apparatus of claim 4, wherein the control unit is configured to differentially apply the pressure threshold value of performing the operation for protecting the pedestrian depending on a speed of the vehicle at a time of collision.

7. The apparatus of claim 1, wherein the control unit is configured to determine whether to perform an operation for protecting the pedestrian based upon a received current speed of the vehicle and the received pressure values.

8. The apparatus of claim 7, further comprising an acceleration sensor outputting an acceleration value of the vehicle, wherein the control unit is configured to prevent the operation for protecting the pedestrian when an accumulation amount of X-axis acceleration values sensed by the acceleration sensor is over a predetermined threshold value.

* * * * *